United States Patent [19]

Brodbeck

[11] E Patent Number: Re. 31,649

[45] Reissued Date of Patent: Aug. 21, 1984

[54] COMBINED TELEPHONE INDEX AND KEYBOARD FOR DIALER

[75] Inventor: Robert M. Brodbeck, Littleton, Colo.

[73] Assignee: Marcamor, Inc., Denver, Colo.

[21] Appl. No.: 292,175

[22] Filed: Aug. 12, 1981

Related U.S. Patent Documents

Reissue of:

[64] Patent No.: 4,164,630
Issued: Aug. 14, 1979
Appl. No.: 851,149
Filed: Nov. 14, 1977

[51] Int. Cl.[3] ..... H04M 1/274

[52] U.S. Cl. ..... 179/90 B; 179/90 BD; 179/90 CS; 340/365 VL

[58] Field of Search ..... 179/90 B, 90 BD, 90 CS, 179/90 BB; 340/147 A, 365 VL

[56] References Cited

U.S. PATENT DOCUMENTS

| | | | |
|---|---|---|---|
| T966,005 | 1/1978 | Gillette | 179/90 B |
| 2,995,726 | 8/1961 | Rickard | 340/365 VL |
| 3,531,599 | 9/1970 | Bodie | 179/90 BD |
| 3,553,387 | 1/1971 | Wells | 179/90 CS |
| 4,010,330 | 3/1977 | Shio | 179/90 B |
| 4,277,651 | 7/1981 | Fisher et al. | 179/90 B |
| 4,278,845 | 7/1981 | Chiou | 179/90 B |

FOREIGN PATENT DOCUMENTS

| | | | |
|---|---|---|---|
| 1219547 | 1/1971 | United Kingdom | 179/90 B |

*Primary Examiner*—Gerald L. Brigance
*Attorney, Agent, or Firm*—Ancel W. Lewis, Jr.

[57] ABSTRACT

A telephone card index, having a switch connected to the card finder for initially locking on to a memory section of a miniprocessor[, a]. *A* key aligned with each name line of the card locates the exact memory address of the number to be called with pre-recorded dial signals at the memory address for an individual name line, [permits] *permitting* automatic telephone dialing of the selected number. A keyboard in the circuit, with a display, permits adding, changing or recalling the recorded number at each address.

7 Claims, 10 Drawing Figures

MC-MEMORY CLEAR
MR- MEMORY RETAIN
C-CLEAR ( FOR CORRECTION)
CE-CLEAR ENTRY
AD- AUDIO DIAL
E-ENTER

COMBINED TELEPHONE INDEX AND KEYBOARD FOR DIALER

Matter enclosed in heavy brackets [ appears in the original patent but forms no part of this reissue specification; matter printed in italics indicates the additions made by reissue.

PRIOR ART

Many telephone users find an automatic dial telephone system very desirable. Some systems have been proposed, but all seem to be deficient in some respect. In U.S. Pat. No. 2,813,931 to DeForest, there is described an early attempt to provide an automatic dialer. The device uses a mechanical arrangement for rotating the dial ring of a dial telephone. Such a system is not satisfactory for touch tone systems, for example. Another mechanical dialing device is described in U.S. Pat. No. 2,830,129 using card shaped plates with wavy grooves to laterally move a follower to proportionally rotate the dial ring of the telephone.

A [scroll, shaped] *scroll-shaped* magnetic memory tape is used in Kuehnle U.S. Pat. No. 3,495,299. The scroll is provided with visual addresses for the stored telephone numbers. The construction uses a longitudinal scroll for a series of sections, each section of which includes plural transverse names and numbers. A traveling head is moved to the transverse name line to permit [retrieve] *retrieval* of the dial signal on magnetic scroll. The scroll must be [longitudinal] *longitudinally* moved to permit scanning for a particular section.

The Brafman U.S. Pat. No. 3,899,645 describes a system for automatically dialing from a repertoire of numbers in sequence. This may include a recorded message sender. The processor is described for completing various functions according to the results from the called number. However, the dialing is sequentially from the list of numbers in a repertoire.

A double scroll arrangement is shown in Mosley[,] et al U.S. Pat. No. 4,029,908. One scroll contains visible names and telephone [number] *numbers*, while the other scroll is a magnetic tape with signals which correspond to the desired number on the visible scroll. The tapes of both scrolls must be synchronized and remain synchronized for operation. Both scrolls are manually and conjointly moved.

The circuitry and switching arrangement of an automatic dialing telephone is shown in Connelly et al U.S. Pat. No. 4,032,722 using a switch unit of 11 manually operable 10 way (or lead) switches. A number may be pre-set by the switches and a push [bottom] *button* actuates [a] digital tone signals or impulses corresponding to the pre-set number.

THE PRESENT INVENTION

According to the present invention, there is provided a [retrieve] *retrieval* system combined with a card telephone index, which simply and quickly arranges the retrieve of a pre-recorded number, corresponding to the visible name display in the index, for single button actuation of an automatic dialer for the retrieved number. Also[,] included in the unit is a keyboard for introducing, retrieving or erasing numbers in a memory bank for the automatic dialing system.

OBJECTS AND ADVANTAGES OF THE INVENTION

Included among the objects and advantages of the invention is to provide an easily used card index for telephone numbers and names, combined with an automatic dialing system for telephones, for locating a prerecorded telephone number in a memory bank and actuating the dialing system with a single button.

Another object of the invention is to provide a multiple card telephone index having switch means for initially locating and latching to a multiple name group in a memory bank of an automatic dialing system.

Yet another object of the invention is to provide a multiple card telephone index having manual moving switch means for immediately locating a multiple name group in a section in a memory bank and locking the circuitry on that section until the switch means is moved on contacts.

Still another object of the invention is to provide a multiple card telephone index [, and] having single push button switch means actuating a dial means for each address line on the card being displayed.

A further object of the invention is to provide a card telephone index interconnected with an automatic dialing system, with an integral enter, retrieve and erase keyboard system.

Another additional object of the invention is to provide a flip card telephone index integrated with an automatic telephone dialer to initially latch on a group or block of addresses in a memory bank corresponding to each card and[,] actuated by impulses from a memory bank on initiation by a single button for each equivalent address line on the cards of the index.

A still additional object of the invention is to provide a rotary card telephone index integrated with an automatic telephone dialer to initially latch on a group or block of addresses in a memory bank corresponding to each card and actuated by an impulse from a memory bank on initiation by a single button for each equivalent address line on the cards of the index.

GENERAL DESCRIPTION OF THE INVENTION

A multiple card index of telephone numbers is arranged with switch means to initially latch circuitry to a section of a bit storage means containing the addresses of a group or block of names, with each address of each group having an equivalent address which is coupled to an actuating button. It provides a double switch arrangement where the first switch latches on a group or block in the storage means and *a* plurality of switches arranged so that each switch activates data retrieve means from the equivalent line in every group or block, so as to impress the dial impulses on a telephone line entered on that line in that group. The groups are feasibly arranged alphabetically, and each group or block may be provided with a number of specific addresses, for example, 8, 10, 12, 14–20 or more. In one specific card index, seven cards are arranged with five split lines for addresses and thus ten actuating [button] *buttons*. This provides for 70 telephone numbers, generally listed alphabetically. In another form, a flip card index uses 18 cards and 20 lines (each with a button) to provide for 360 telephone numbers. In a rotary card index having 26 cards and 20 names per card, 520 telephone numbers may be listed for automatic dialing. For practicality the number of actuating buttons (or lines per card) should be held to a low number, but the number of cards may be increased to any desired number; for example, the letters B, C, H, M, R, S and W generally provide the largest sections of a telephone directory (listed by last name, of course) and thus multiple cards could be used for them (as B-1, B-2, etc.), giving any number of possible names with telephone numbers. The memory means must, however, be large enough to accommodate the number of spaces on the cards.

BRIEF DESCRIPTION OF THE DRAWINGS

Additional and further objects and advantages and methods of use will appear obvious from the following description and appended drawings, in which.

SPECIFIC DESCRIPTION OF THE DRAWINGS

Figure 1:
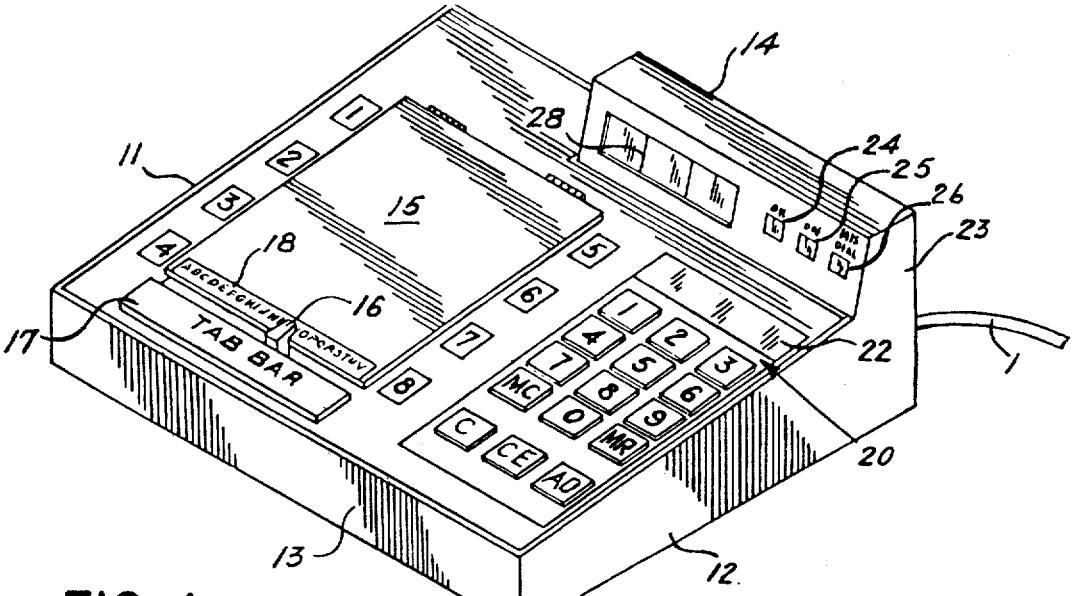
FIG. 1 is a perspective view of one form of the invention, using a [bottom] *button* triggered flip card telephone index associated with a keyboard and display means.
Figure 2:
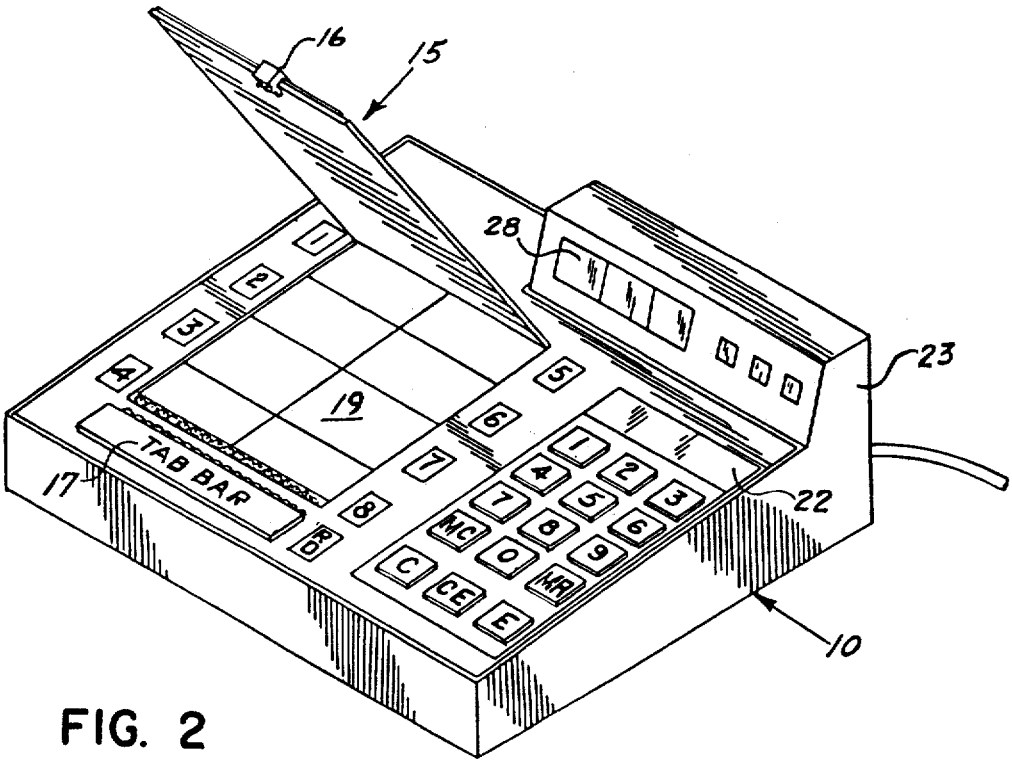
FIG. 2 is a perspective view of the device of FIG. 1 with flip card index in open position showing the actuating buttons for equivalent address lines of the cards, visually giving the name, and perhaps the telephone number, of the telephone of the party to be automatically dialed.

In the device shown in FIGS. 1 and 2, a housing shown generally by numeral 10, having sides 11 and 12, front 13 and back 14 provides a container for the components of the invention. A flip card telephone index 15 is mounted in the top of the housing and it includes the slide, card finder 16 and a trigger bar 17 which opens the index to the card indicated by the slide 16 on the unit. A card index locator 18 indicates a particular card for the positioning of the slide 16. Such card indexes are common, with the use of notched cards, normally progressively notched from one side to the other, or the end adjacent the slide bar, so that a slide having a tab will lift all the cards above the particular desired card leaving the card, for example card 19 of FIG. 2, exposed when the lid or door 15 is raised. The card 19 includes a plurality of left-hand line areas and right-hand line areas, the left-hand and the right-hand lines being equal in number. The trigger bar 17 releases the latch to permit the spring loaded door to open. A keyboard (shown generally by numeral [) 20] *20*) is [,] also [,] provided in the top of the housing including a series of keys for the digits 1–9 and a zero key immediately under the 1. A button marked MC is for Memory Clear and adjacent thereto is a MR button for Memory Retain. Below the lower set of keys is a C button for Clear, CE button for Clear Entry and an E button for Enter. A display window 22 above the keyboard provides a display of the figures entered by the keyboard. Such display, as is commonly known, may be in LED (Light Emitting Diode) and LCD (Liquid Crystal Display) or any other desired visual display mode of the numbers entered by the keyboard. A small housing projection 23 above the keyboard includes three signals, including power on light 24, power mode of the unit 25, which may indicate that the unit is not in operating condition, and signal light 26 to indicate a misdial. Another visual display panel 28 is provided adjacent to the signal lamps to indicate the number actually dialed by the automatic dialing system, and preferably it displays as the number is dialed or may display a retrieved number for recall purposes.

Figure 3:
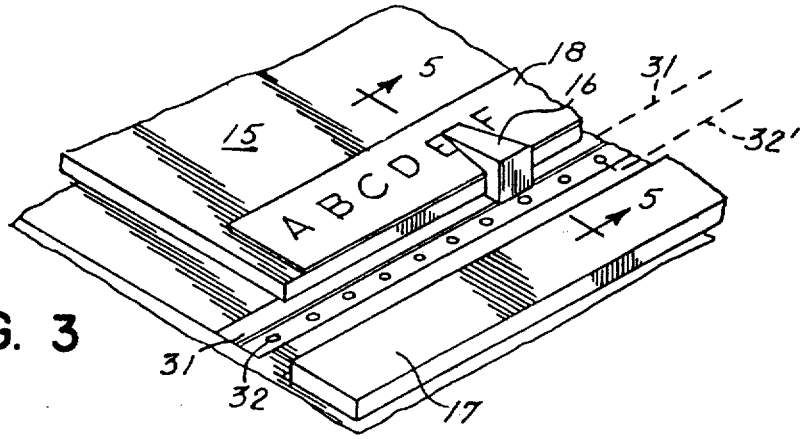
FIG. 3 is an enlarged detail of one form of an index trigger with an associated latching switch means.
Figure 4:
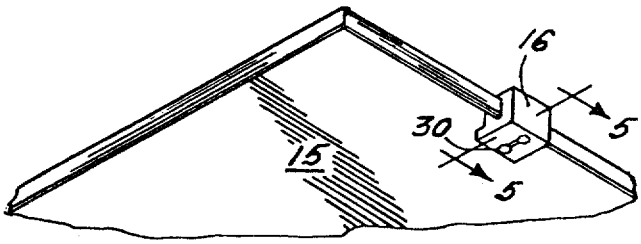
FIG. 4 is an enlarged detail view of the contacts of the switch means of FIG. 3.
Figure 5:
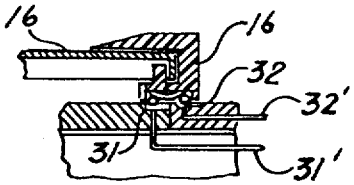
FIG. 5 is an enlarged cross-sectional view of the trigger and switch means of FIG. 4 taken along section lines 5—5.

The switch arrangement for initially latching onto a block of data, represented by the data on each particular card, is illustrated in FIGS. 3, 4 and 5 wherein the slide finder 16 includes a contact 30 on its base which is arranged to switch contact elements mounted in position to contact the contact 30 when the code index cover is closed. The switch elements include a common contact 31, and a series of contacts 32 which are arranged with one contact for each card [,] in the stack of cards in the card index. The common contact 31 includes a single lead 31' which connects with the circuitry of a micro processor, memory autodialer, etc., and each individual contact 32 includes its own lead 32' which also is connected to the circuitry aforementioned so that movement of the slide 32 [,] also [,] moves the contact 30 to complete a circuit equivalent to the particular card. This provides electronically finding the circuit of the block of data which corresponds to the particular card indicated by the slide 16. The circuit is latched to the memory by known latch circuits and it remains latched until the cover is closed and the slide moved. A particular telephone number, a shown on the card 19, may be retrieved and transmitted to an automatic dialer [,] by pressing the button corresponding to the line of that particular card. As shown in FIG. 2, the buttons are 1–4 to represent four left-hand lines on one half of the card, and 5–8 to represent four right-hand lines on the other half of the card.

Each card in the stack of cards represents a block of data, which may include a series of words, that is, each word is 12 to 64 bits, each word and numbers are represented by one of the lines of the card. The stored data at each address represents the telephone number of the person or firm visually represented on the card, with the telephone number being entered into the memory bank through the keyboard in [computor] *computer* language, and the number to be entered shown in display 22. The unit may be connected to a telephone line, represented in FIG. 1 by line 1, which, of course, includes plural conductors as is common in the art.

The unit includes an information processing and storage system for information fed into the unit through the keyboard 20, as is common in the [computor] *computer* art. A memory, or storage, usually stores data in digital information and this may be retrieved, processed into dial impulses and transmitted to the telephone switching unit. The storage may be of either a moving surface device or an entire electronic device, as is well known in the art. In either case the data to be stored, as representing the desired telephone numbers, is stored in blocks, with each block representing a single card in the card index. For example, as shown in FIG. 3, the slide finder is on the letter E, and when the slide is moved to that position, the contact 30 contacts the common contact bar 31 and the single contact[,] (32) of the E position. By means of a latching circuit, the circuit to the memory block is latched to that information block of the memory bank representing the E card, such latching circuits being common. The latching circuit is arranged to maintain the circuitry latched onto that memory block until the slide is moved to a different set of contacts. The block will be maintained in the circuit even though the cover 52 is raised and the contact 30 is no longer in contact with the common contact 31 and the individual card contact. With the cover in the upright position, the name of the person desired (whose last name begins with E) may be readily found on one of the lines on the card, and the button of that line is pushed to actuate a memory retrieve and an automatic dial mechanism. As pointed out above, the retrieve means is a commonly known device in the electronic microprocess and memory art. And automatic dialers are well-known in the art, for example U.S. Pat. Nos. 3,899,645 and 4,032,722 described before.

Figure 6:
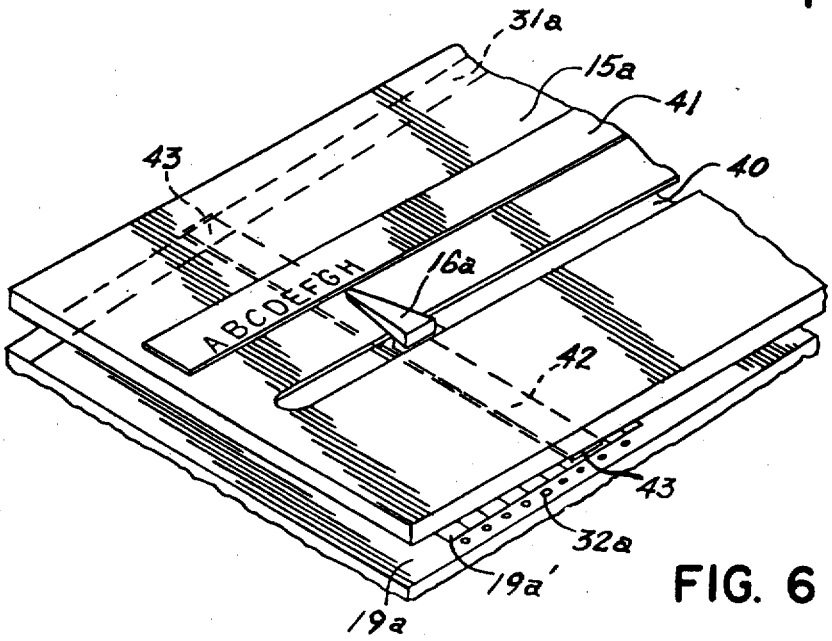
FIG. 6 is an enlarged view of a modified form of card index having a center sliding finder for the cards of the index.

As shown in FIG. 6, a modified card index is illustrated wherein the cover 15a includes a center slot 40 and a letter index 41 therealong, so that the slide 16a moves along the center slot 40 indicating the alphabet letter of the card to be displayed when the unit's cover is opened. This particular slide includes a cross bar 42 having turned under ends 43 on both sides which are arranged to hold the cards, having a portion the width of the slide ends 43, and to release those cards where the width is less than the slides. This is a common type of card index. The slide 42 provides a sliding contact similar to 30 for contacting a common contact 31a by the end 43 on that side, and contacting the individual contacts 32a on the opposite side by the other turned under end 43. The cards are provided with cutout portions on the sides to permit the slide to raise and lower without contacting a portion of the stack of cards. Thus card 19a has a cutout running almost its full length so that its contact with end 43 only occurs under the *card* 19a exposing the card A. In the same manner, card 19a' has a shorter cut out, so that the contact 43 slides under the card listing both the cards 19a and 19a' exposing the B card. The remainder of the unit operates in the manner as described for FIGS. 1 and 2.

Figure 7:
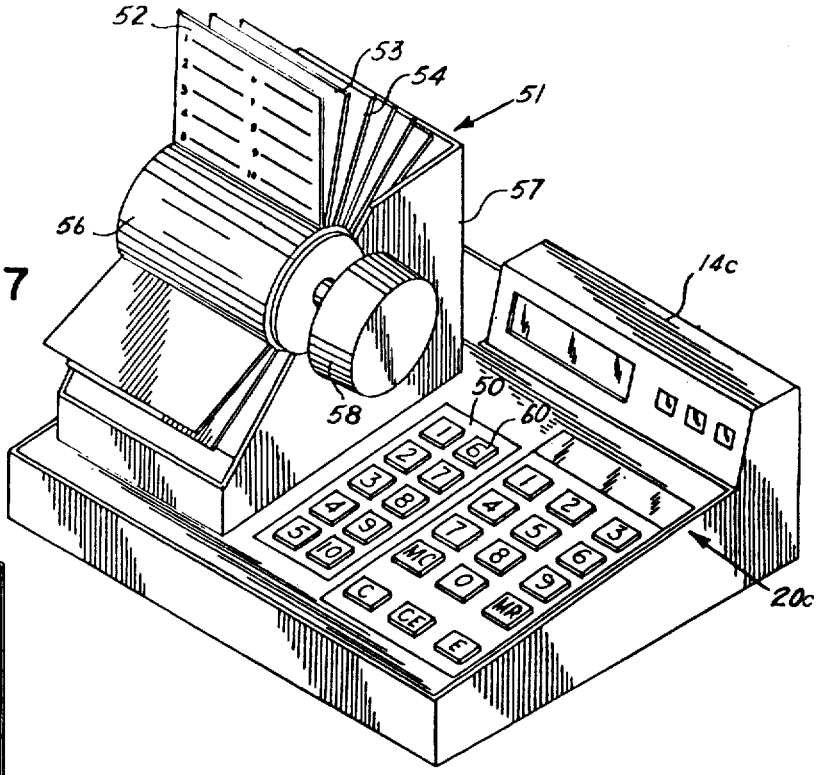
FIG. 7 is a perspective view of a rotary card index for integration with a processor, memory bank and automatic dial means for a telephone.
Figure 8:
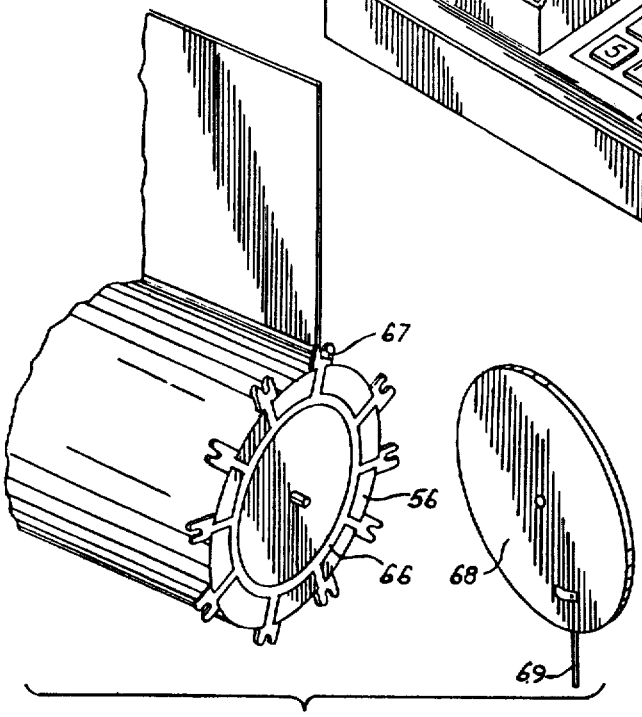
FIG. 8 is an exploded, schematic view of one end of a rotary card index showing a rotary switch contact means for the common contact of all cards of the index.
Figure 10:
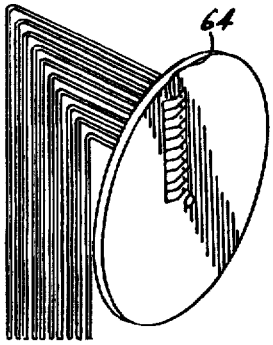
FIGS. 9 and 10 show the rotary switch means providing the other contact for each card to complete a circuit to a processor and each individual group of the data storage corresponding to the card in visual position.
Figure 9:
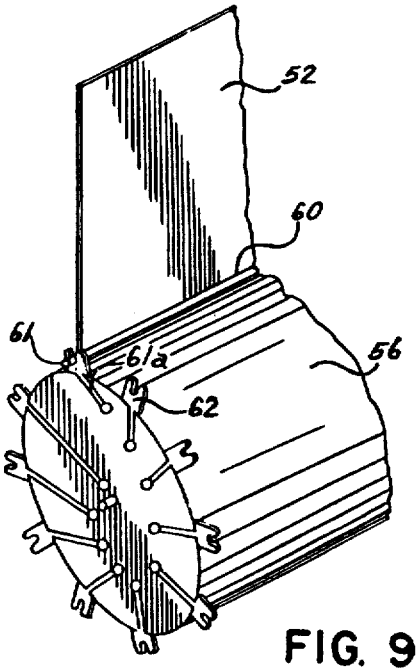

The device of FIG. 7 includes a housing 20c [in manner] *as* shown in FIG. 1, including the display means 14c, a keyboard 20c (with display) and an individual, card-line, pushbutton set 50. The card index, shown in general by numeral 51, is a rotary card index which includes a plurality of cards 52, 53, 54, etc., secured to a shaft 56 mounted in a housing 57 and including a turning knob 58. Such units are known in many forms and shapes. Each card (FIG. 9) includes a conductor 60 running along its base arranged to be in connection with a contact at one side for the individual card contact lead and a common contact at the opposite side. This forms the switch circuitry to a block in memory, and a line button provides a switch for the individual address of data in the block. The card includes a conductor projection 61 (at each side of the card bottom) which is to be mounted in a card holder 62 (on the shaft) and the projection 61 includes a lead 61a to an individual contact 62. Each card is mounted in the fixture and a lead (not shown except for card 52) goes to the individual contact for that particular card location. The contacts are brush contacts which spiral inwardly around 360°. The wire contacts 62 are arranged to contact one single contact of the series of contacts 64 mounted on the housing in a stationary position, and the row of contacts 64 are so positioned that the card which is held in upright position (in a visible position to observe the lines on the card) has its individual contact in communication with its contact 64. Release notches may be provided to insure that the shaft is stopped exactly at the point where a brush contact is in electric contact with the stationary contact 64 on the housing. In this manner, one end of the card has its brush contact in contact with only one of the contacts on the housing. Leads from those individual contacts extend to the processor as afore explained. The common contact may be a ring 66 (FIG. 8) in sliding contact with each card end on the end of the shaft 56, holding the cards so that all of the ends of the card conductors are in contact with the ring contact 66. A wire or brush contact 67 extends from the end of the shaft, and it in turn contacts a stationary ring contact 68 mounted on the housing. The ring is provided with a lead 69 extending to the processor to complete the circuit with the individual contacts of the cards at the opposite end. In this manner the circuit is completed when a particular card is moved into upright position, so that its brush contact is in contact with one point contact 64 at one end of the shaft and the common lead on the other end, and completes the circuit to a micro-processor. The completed circuit actuates the processor to the block of data represented by that particular card. The name and/or telephone number as indicated visually on the particular line of the card is then actuated by depressing one of the buttons 60 on the button console 50. As in the above example, one button is arranged for each line. Also, the movement of the rotary card index to the stop position forms a circuit for the particular card in upright position, through the brush arrangement specified above, and a latch circuit is instituted so that the processor latches onto the block of information in the memory. The individual word or data is then retrieved by depressing the line button, which actuates a dialer to impress dialtones on the telephone line to which the unit is attached.

The unit is arranged to display any number in the memory bank, merely by adjusting the card selector to the proper position to display the desired card, and by depressing the memory display button. Pressing the button of the particular line[,] displays the telephone number in the visual display 28 (FIG. 1). This insures that a correct number is in the memory bank, being the same as shown by the visual display on the card. When it is necessary to change a number, the same processes may be instituted to show the number in the data bank on display 28[,] and, by depressing the Memory Clear, that data is cleared from the memory bank. The correct number may then be added by depressing the proper buttons on the keyboard 20 (which is shown the display 22), and then depressing the enter button when the number is complete. This impresses the correct number in proper computer language in the correct place in the memory bank. Also, when it is desired to enter a new number into the memory, the particular card is displayed by the card finder, and the memory retrieve is depressed for the individual line. [*If the memory line is,* a new number may be entered.] If a number shows in the display 28 then the line is not blank and the information may be corrected. This procedure assures that the line in the memory is the same as the card information. Also, a rechargeable battery may be included in the unit to insure that the memory is not erased in the event that the line voltage from the telephone line is accidentally cut off. Also the two visual displays may, of course, be replaced by a single display, as desired.

In many instances it is highly desirable to be able to redial a number (where the first dialing is to a busy line). A redial button labeled RD, below the No. 8 line button of FIGS. 1 and 2, may reactivate the dialer to the last number to which the switches are set. This permits multiple redialing without changing the switches, or resetting them. The memory readout of the particular setting is accomplished by pressing the MR button, to visually display the number to which the switches are set.

The device has high utility where a number of individual numbers are called on a frequent basis. For example, purchasing agents usually frequently call a series of telephone numbers, and they will find that the unit is highly effective since the automatic dialing relieves the stress of dialing each and every number on a repetitive basis. Another high use is a telephone answering service which may have several hundred numbers, which are generally called on a very frequent basis. In such a case, the rotary card index would be highly useful, since such a unit could be made to store several thousand telephone numbers. It is, also, important to note that in the event a user calls one particular number, for example his own home number, the indicators[,] for the flip card index[,] may be moved to the initials of his last name[,] and, since the line number is known, the button of that line may be depressed to actuate the dialer without actually opening the cover 15. Thus, it is seen that the invention provides a simple, easy to use index and switch arrangement for an automatic dialing mechanism having a memory bank for numbers to be called.

What is claimed is:

1. Telephone index and combined switch arrangement for memory stored dialing data for automatic dialing telephones comprising:

(a) a housing having an entry keyboard switch means thereon for entering numbers to be stored and display means for displaying the number entered by said entry keyboard[,];

(b) multiple card index means for a visual listing of names and telephone numbers, each card including individual lines for individual numbers arranged in the same position on the cards, wherein said card and lines are divided into a plurality of left-hand lines and a plurality of right-hand lines, said left-hand and right-hand lines being substantially equal in number, and further including a cover positioned over said cards and finding means on said cover for positioning an individual card for visual display of the card's content;

(c) card switch means including an individual [contract] *contact* associated with each card index and activated by positioning said finding means to display the particular card to thereby close said card switch means completing a circuit for said card including a common lead and a common bus bar associated with said finding means and an individual lead for each card, said card switch means being initially energized when said cover is closed;

(d) selector switch means including a left-hand and a right-hand series of push buttons with one button in said left-hand series for and adjacent to each of said left-hand lines and one button in said right-hand series for and adjacent to each of said right-hand lines so that said selector switch means is activated by a push button to close a circuit for a particular line positioned on an individual card to thereby complete a first circuit associated with the card contained data and close a second circuit associated with a particular line on a card to retrieve and automatically dial a telephone number stored at a location in the memory associated with said particular line; and (e) a visual display panel means on said housing adjacent said cover for displaying the number dialed by actuating said card switch and selector switch.

*2. In a telephone index and combined switch device for memory stored dialing data for automatic telephone dialing, the combination comprising:*

*multiple card index means including a plurality of cards one on another for visual listing of names and telephone numbers, each card including individual lines for individual names and telephone numbers, a cover positioned over said cards, and finding means on said cover for positioning an individual card for visual display of the card's content;*

*card switch means activated by positioning said finding means, said card switch means initially latching onto a memory block of data representing an individual card when said cover is closed, said latching being completed via said card switch means when the cover is closed whereby, with a first card selection and with said cover closed, the latching for the first card selected remains in effect until said finding means is moved to a second card selection and said cover is closed; and*

*selector switch means including a number of pushbuttons equal to the number of lines on one of said cards, one of said pushbuttons associated with each of said lines, each said pushbutton connected in a second circuit corresponding to a particular line and a particular selected card which, upon activation of a selected pushbutton, is effective to retrieve and automatically dial a telephone number stored at a location in a memory corresponding with the telephone number of the particular line that has been selected.*

*3. In a telephone index and combined switch device as set forth in claim 2 wherein said card switch means has a a circuit-completing portion carried by said cover.*

*4. In a telephone index and combined switch device as set forth in claim 2 wherein said card switch means includes a common bus bar, a contact for each card, and a circuit-completing portion that is movable conjointly with said finding means for electrically connecting said common bus bar to successive contacts for an individual selected card according to the position of said finding means.*

*5. In a telephone index and combined switch device as set forth in claim 2 including a housing having an entry keyboard switch means thereon for entering numbers to be stored and display means for displaying the number entered by said entry keyboard.*

*6. In a telephone index and combined swich device as set forth in claim 2 wherein each of said cards and lines are divided into a plurality of left-hand lines and a plurality of right-hand lines, said right-hand lines being substantially equal in number.*

*7. In a telephone index and combined switch device as set forth in claim 2 including visual display panel means on said housing adjacent said cover for displaying the number dialed by actuating said card switch means and selector switch means.*

* * * * *